United States Patent [19]

Lang

[11] Patent Number: 4,884,193
[45] Date of Patent: Nov. 28, 1989

[54] WAVEFRONT ARRAY PROCESSOR

[76] Inventor: Hans-Werner Lang, Hansa-Strasse 48, 2300 Kiel, Fed. Rep. of Germany

[21] Appl. No.: 908,580

[22] Filed: Sep. 18, 1986

[30] Foreign Application Priority Data

Sep. 21, 1985 [DE] Fed. Rep. of Germany ....... 3533800

[51] Int. Cl.[4] ............................................. G06F 15/16
[52] U.S. Cl. ..................................................... 364/200
[58] Field of Search ............................. 382/27, 54, 49;
364/200 MS File, 900 MS File

[56] References Cited

U.S. PATENT DOCUMENTS

| | | | |
|---|---|---|---|
| 4,509,187 | 4/1985 | Acklund | 364/200 |
| 4,580,215 | 4/1986 | Morton | 364/200 |
| 4,593,351 | 6/1986 | Hong | 364/200 |
| 4,697,247 | 9/1987 | Grinberg et al. | 364/900 X |
| 4,739,474 | 4/1988 | Molysztynski | 364/200 |

OTHER PUBLICATIONS

Kung S., "On Supercomputing with Systolic/Wave Front Array Processors," Proceedings of the IEEE, vol. 27, No. 7, Jul. 1984.

Orue A. Y. and Prakesh D., "Routing Algorithms for Cellular Interconnection Arrays," IEEE Transactions on Computers, vol. c-33, No. 10, Oct. 1984.

Primary Examiner—David L. Clark
Attorney, Agent, or Firm—Bauer & Schaffer

[57] ABSTRACT

In the operation of a highly integrated wavefront array processor having n×m processor cells arranged in n rows and m columns, an instruction code is shifted respectively, in hoirzontal and vertical directions between adjacent processor cells from one processor cell to the respective next horizontally and vertically adjacent processor cell. A first group of n row selection bits and a second group of m column selection bits are selectively shifted through the processor cell array to release certain processor cells for the execution of the instructions.

2 Claims, 7 Drawing Sheets

WAVEFRONT ARRAY PROCESSOR

The invention relates to a method of operating a highly integrated wavefront array processor as well as to the construction of a highly integrated wavefront array processor.

Wavefront array processors are known from "Transactions on Computers", November 1982, VOL. C-31, pp. 1054-1066.

The known wavefront array processor has the drawback that each processor cell needs to be equipped with a special program memory in order to achieve satisfactory flexibility. Each individual processor cell is subsequently burdened with a relatively complex construction which limits overall integration density.

It is the object of this invention to develop both a process for operation of and a wavefront array processor itself capable of insuring high flexibility without requiring special program memories for individual processor cell.

The invention solves the problem by shifting an instruction code through the processor array. The corresponding wavefront array processor is characterized by a instruction shift register that is attached to each processor cells, whereby the instruction shift register is connected with the corresponding instruction shift register of at least one of the neighboring processors in such a way that an instruction code can be moved through the processor array.

Further objects and advantages are set forth in the following disclosure and are shown in the accompanying drawings in which an operational example of the invention, is contained:

In the Drawings

Figure 1:
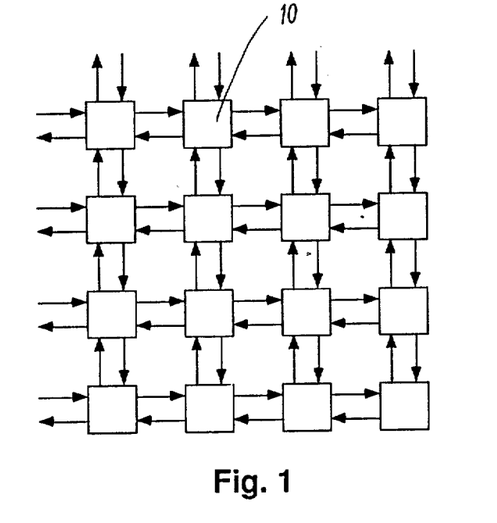
FIG. 1 shows a schematic representation of the processor's basic design and of the communication between individual processors.

FIG. 1 illustrates the basic construction of a parallel computer which consists of n rows and m columns of processor cell 10. Each of cells 10 can execute instructions from instruction set I, whereby the time needed to execute each of the instructions is the same.

Each processor cell 10 has several data registers including a special communication register that exchanges data between processors. In such an exchange, each processor cell 10 can read the communication register of its four immediate neighbors, but can only write into its own communication register.

The arrows shown in FIG. 1 indicate that each processor 10 communicates with all of its four neighbors. The open arrows at the edge of the array illustrate the input and output of data.

Figure 2:
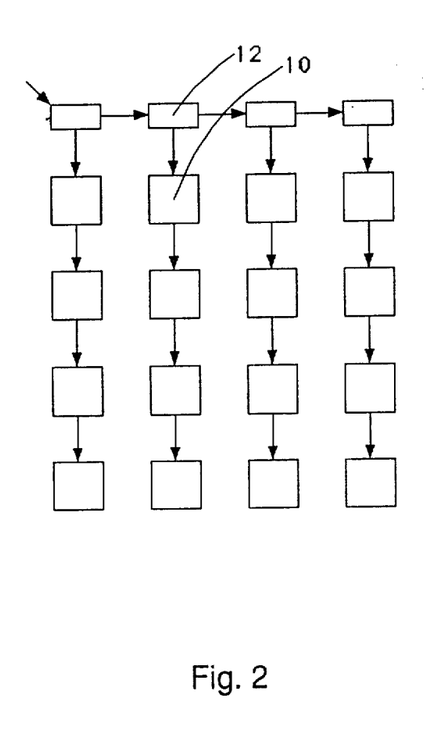
FIG. 2 contains an illustrative representation of the transfer of instructions the processors are to execute.
Figure 3:
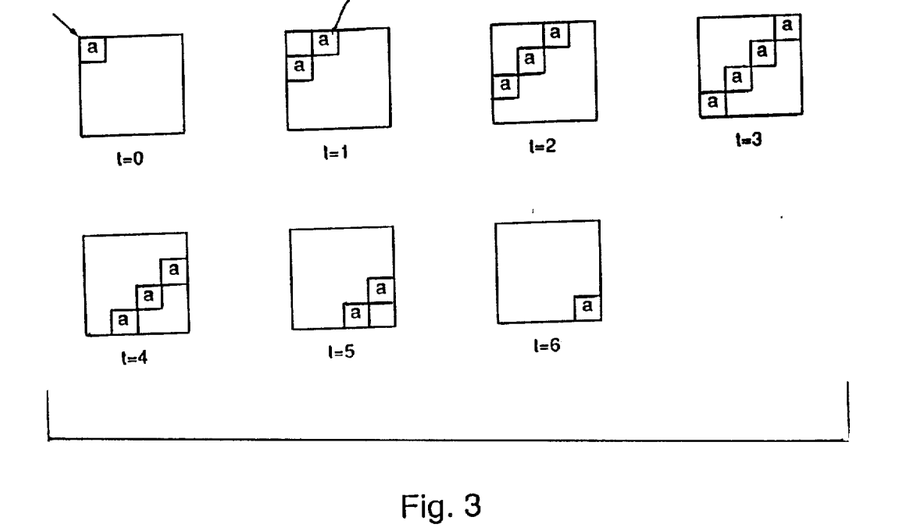
FIG. 3 illustrates the wavefront-like diagonal shifting of instructions.

FIG. 2 indicates the transfer of instructions from one processor cell to the next processor cell 10: special boundary processor cell 12 situated outside the array transmit each instruction to the right and into the first row of processor cell 10. The processor cells 10 of the actual processor array pass on the instructions only to their neighbors in the next row. An instruction that is entered into the boundary processor cell of the first row is thus transmitted to the cell 10 in the first row and the first column and to the boundary processor cell of the second column the which then transmits the instruction to the second cell 10 of the first row with the next clock impulse. FIG. 3 illustrates this wavefront-like diagonal shifting of instructions through the processor array: the p-th instruction of a given program reaches the processor 10 (1,1) of the first column and the first row of the array at time p, at time p+1 the processors (1, 2) and (2,1), in general therefore at time p+t ($t \leq 2n-2$) the cells (i, j) with i+j=t+2. With consecutive input of different instruction codes into the corner element, the individual cells 10 of the processor array receive different instructions, whereby cells 10 on a diagonal receive corresponding instructions.

Figure 4:
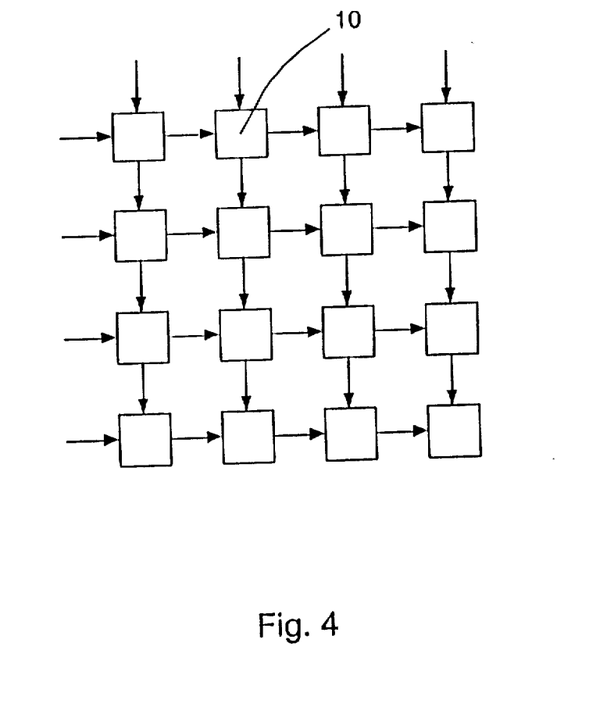
FIG. 4 depicts the selection of processors to be activated.

FIG. 4 indicates in schematic form the transfer of selection bits that activate cells 10 and which are delivered to the cells 10 of the first column and first row from outside in the form of row selection bits and in the form of column selection bits, resp. The cells 10 transfer the instruction selection bits clock impulse controlled to the cells next in column or row to them. Thus in addition to the diagonal current of instructions there is a horizontal flow of row selection bits and a vertical flow of column selection bits. Each cell 10 only executes the instruction in its instruction register if both the corresponding row selection bit and the corresponding column selection bit are "1". If at least one of either of the selection bits is "0", the processor cell executes a "no operation" instruction which leaves the entire register contents unchanged.

Figure 5:
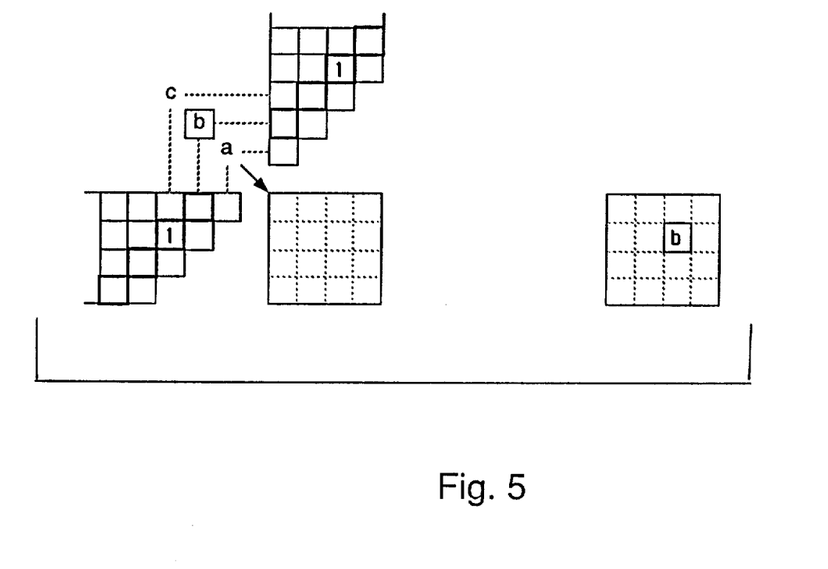
FIG. 5 shows a selection of individual processors in accordance with FIG. 3.

The execution of an instruction in the instruction register of a given cell 10 can be limited to specific cells 10 of the array by properly choosing the n row and m column selection bits that belong to an instruction. In FIG. 5, for example, instruction "b" corresponds to the indicated row and column selection bits (boxed in with dark lines). Since the second row selection bit is "1", the instruction is executed in the second row of the array; and only in the third column since here only the column selection bit 3 is "1". Thus instruction "b" is only executed in the processor cell indicated. It is obvious that with n row and m column selection bits it is not possible to choose all conceivable subsets of n×m cells 10. This limitation does not, however, influence the execution of most algorithms found in common use.

Figure 6:
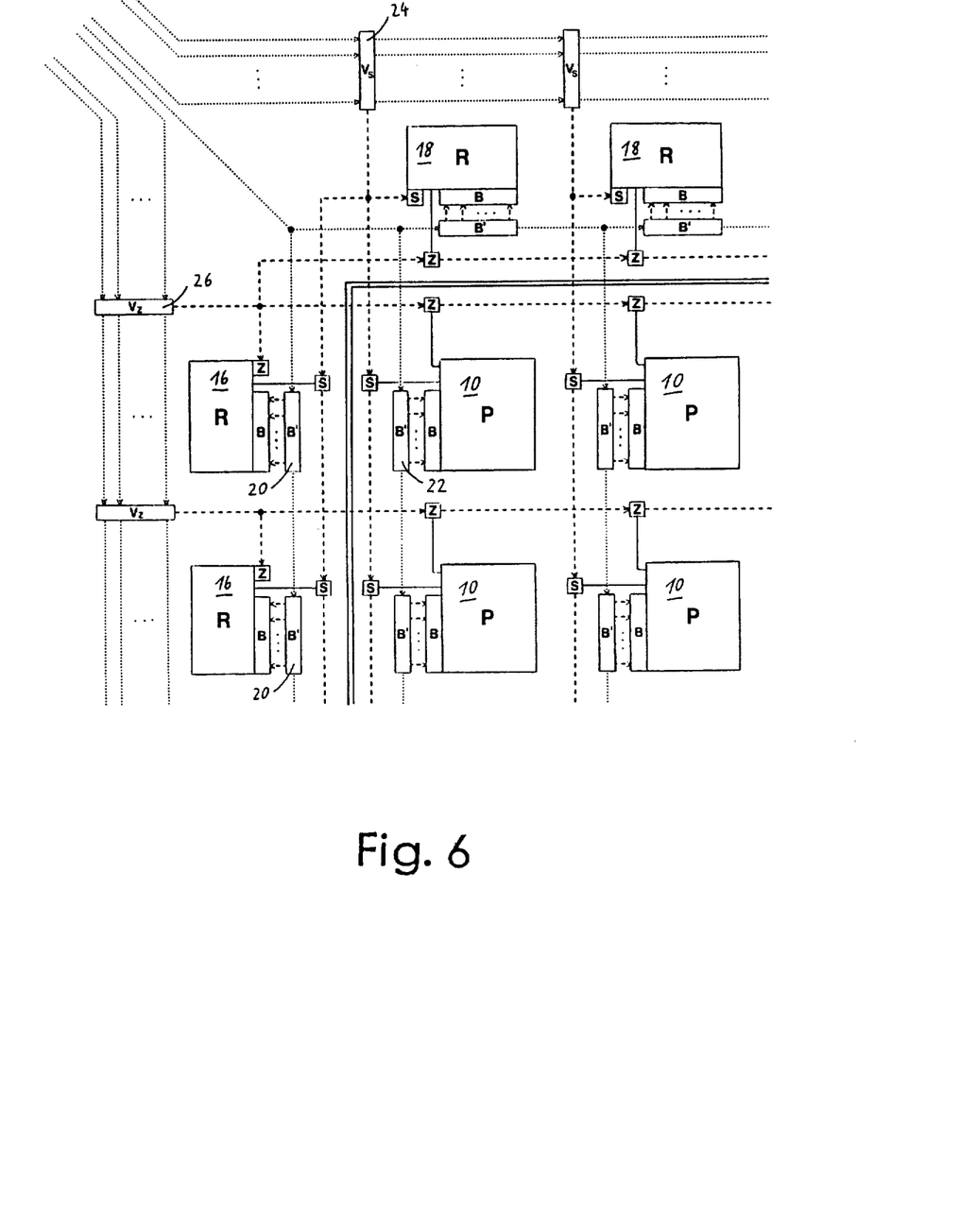
FIG. 6 is a basic circuit diagram of a computer built based on the invention and illustrates its control lines.

FIG. 6 shows a schematic circuit diagram of a parallel computer system consisting of only four array cells 10 and four boundary cells 16, 18 (in actuality the number of cells in the array naturally would be far greater the number of boundary cells corresponding to the number of columns and rows).

Figure 7:
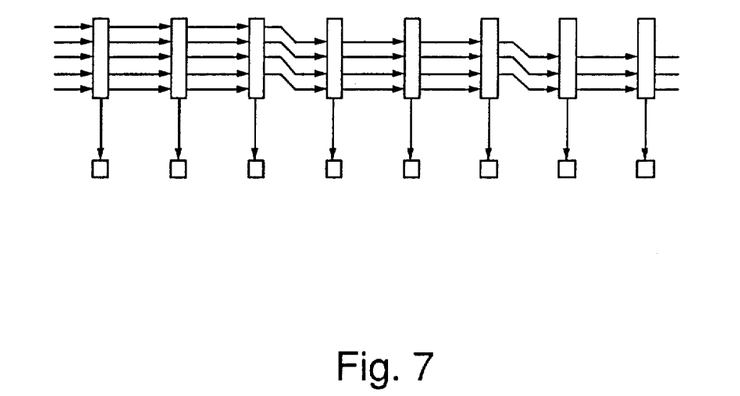
FIG. 7 illustrates how the V-register functions.

The boundary cells assigned to the rows are situated to the left of the processor array (marked off with a double line). Similar boundary cells assigned to the columns of the processor array are indicated on the top margin. The cells 10 in the array and the boundary cells 16, 18 are each equipped with shift registers B', B, S, and Z. The boundary cells 16, 18 differ from the cells 10 in that they have an input/output control instead of an arithmetic and logic unit. Further, the boundary cells have V-registers 24, 26 with parallel access and a bit quantity of n/k or m/k, where k is the number of bit clock impulses per word impulse. These V-registers of the boundary cells perform the function of recording selection bits on an initial basis. The V-registers 24, 26 of neighboring boundary cells are connected one behind the other, such that blocks of selection bits can be shifted along the margin of the array, as shown in FIG. 7, whereby the outputs of the individual $rk^{th}$ V-registers have been placed on the inputs, one step lower, of the $rk+1^{th}$ V-registers (r=1, ... n/k−1).

For each word impulse, 2n+k bit of information is necessary to supply an n×n processor array with instructions and selection bits (per n bit for row and column selection, one k bit instruction word). These 2n+k bit are as a matter of convenience transferred serially at a width of 2n/k+1 bit into the k impulses, which takes a word impulse to complete. In this process, n/k bits per impulse are shifted parallel into the registers Vz and Vs; one bit wanders into the B' register of the processor cell (1,1) as well as into the boundary cells (0,1) and (1,0). The instructions are needed in the boundary cells in order to control the input/output.

At the beginning of the next following word impulse the instruction is taken up into the B-register and the lowest bits from the V-registers 24, 26 into registers Z, S. The lowest bits of the V-registers are therewith "spent" but are still situated in the V-registers. With continued shifting of the V-register contents these bits do, however, disappear since they cannot be passed on between the $rk^{th}$ and the $rk+1^{th}$ boundary cells.

The selection bits transferred parallel with an instruction do not belong to this instruction; they move during computation way ahead of the instruction. Whereas the instruction only shifts one cell further per word impulse, the selection bits in the V-registers are shifted k processor cells further per word impulse.

A two-phase impulse $\rho_1/\rho_2$ is the main clock impulse of the system, whereby the two phases $\rho_1$ and $\rho_2$ do not overlap. The data words of length k are processed in bit serial form. Each impulse $\theta$ signalizes the beginning of a new word and overlaps with each $k^{th}\rho_1$ but not with the previous or subsequent $\rho_1$.

The impulses must be distributed on the chip such that these characteristics hold between each of the neighboring processors.

Since only local communication exists between the cells, it is not necessary that the entire array work fully synchronized; local synchronization between the neighboring cells suffices.

The lines sketched in FIG. 6 indicate circuits that are switched through when $\rho_1$ and $\theta$ are "1"; the dotted lines indicate circuits that are switched through when only $\rho_1$ is "1". While $\rho_1$ and $\theta$ are "1", the instruction situated in register B' is taken over into the B-register of the arithmetic and logic unit. Furthermore, the row or column selection bit is taken over from the previous column or row of the array.

Simultaneously with $\rho_1$ and $\theta$="1" and in the next following k−1 clock impulse the instruction from the arithmetic unit is carried out. These impulses are exploited so as to transfer the instruction in bit serial form into the B'-register of the lower neighboring processor.

Attention should be paid to insure that the functions of the boundary cells can also be taken over by the cells of the first column or first row of a processor array.

The optimal use of a computer designed on the basis of the hardware proposed here naturally presupposes special algorithms.

The program for the transposition of an n×n-matrix will serve as an example of a program that could be employed in the realized version of the computer proposed here ($n=2^k$).

The underlying algorithm transposes iteratively all $2^j \times 2^j$ submatrices, j=1, ..., k. A $2^j \times 2^j$ (j≧1) matrix is transposed in that its four $2^{j-1} \times 2^{j-1}$ submatrices are transposed and then the top right one is exchanged with the lower left one. This occurs via an exchange first of the top two, then of the two left ones, and finally of the top two matrices again (FIG. 8).

Figure 8:
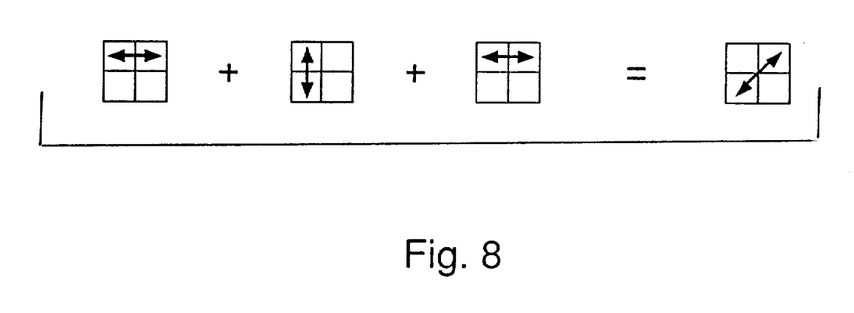
FIG. 8 depicts interchangeable matrices.

When j=1 these submatrices are individual elements that can be exchanged, as shown in FIG. 8, in order to receive a transposed 2×2 matrix.

Figure 9:
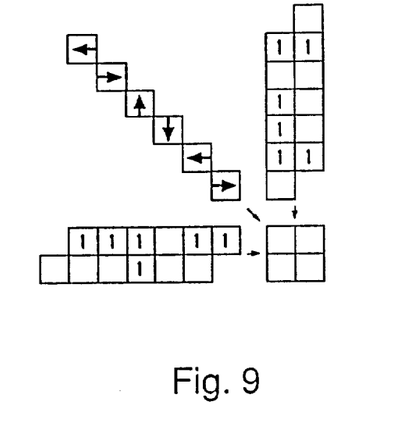
FIG. 9 is a schematic representation of a program for a computer built according to the invention.

FIG. 9 shows the corresponding program for a computer with 2×2 processor cells. An arrow pointing left (right, up, down) indicates one cells reading of the content of its neighboring cells communication register to the right (left, top, bottom) and the entering of such content into its own communication register. The simultaneous execution of a "read left" and "read right" instruction in processors situated side by side instigates an interchange of communication register contents; the simultaneous execution of "read top" and "read bottom" instructions leads to an interchange of communication register contents in processors situated one on top of the other.

The interchanges illustrated in FIG. 8 are exactly those occuring in the second, fourth, and sixth steps of program execution, nothing happens in all the other steps since in none of the cells do row and column selection bits with the value "1" overlap.

Figure 10:
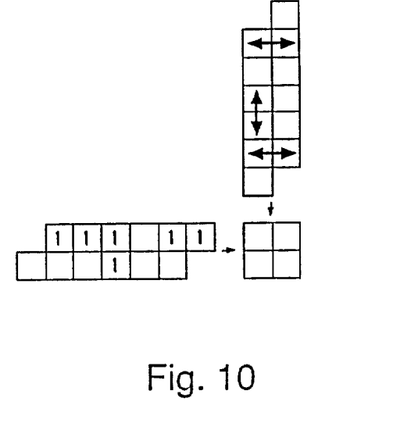
FIG. 10 is a simplified version of FIG. 9.

The program appears somewhat clearer if one equates the "1's" in the column selection flow with the instructions they meet upon entering the processor array. This is permissable since from this moment on, both are shifted parallel down through the processor array and always stay together. One thus receives a vertical instruction flow that intersects with a horizontal row selection flow (FIG. 10).

Figure 11:
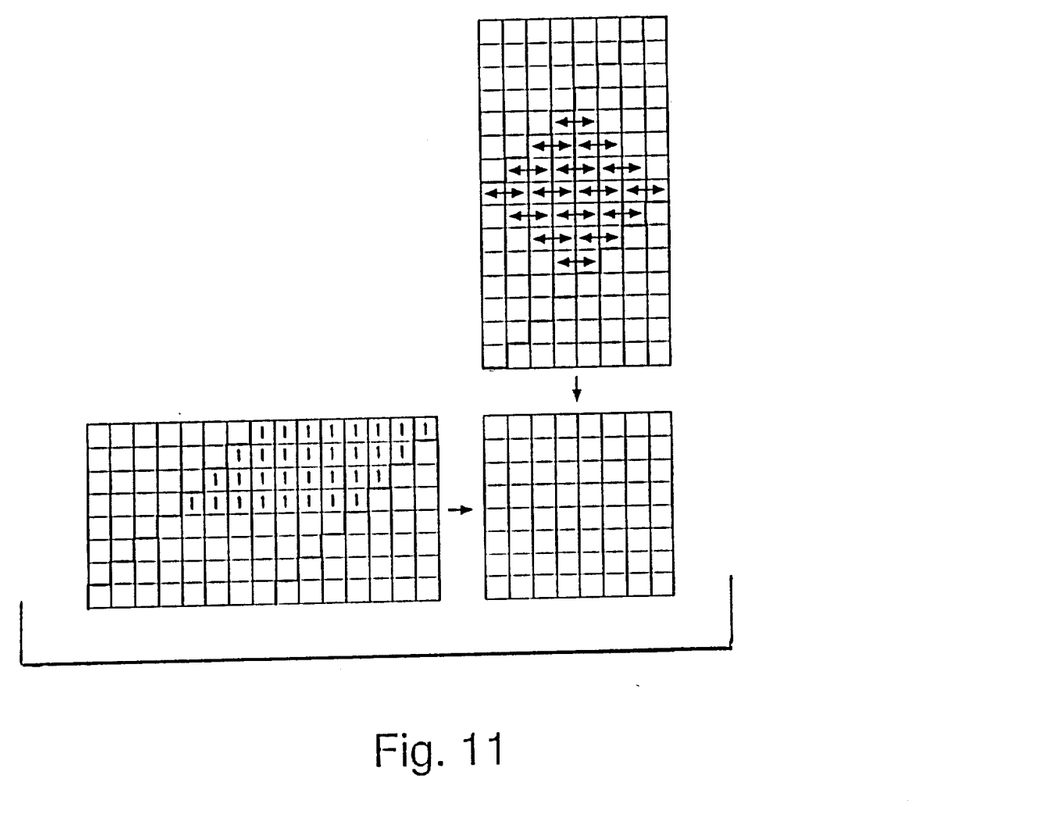
FIG. 11 shows a schematic representation of a program designed to interchange partial matrices.
Figure 12:
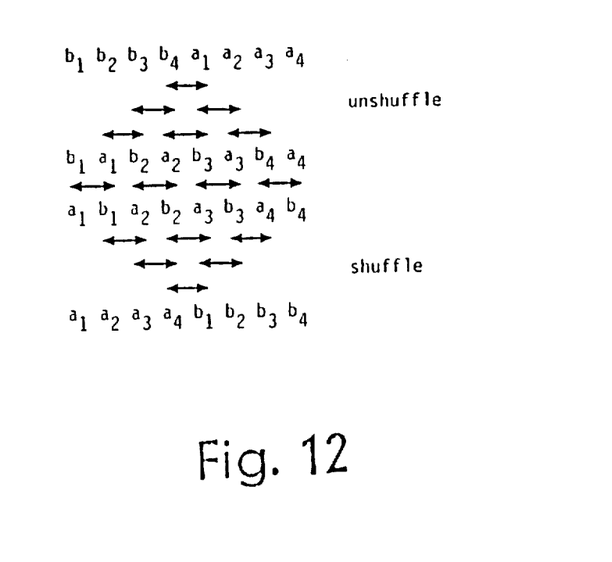
FIG. 12 depicts individual program steps.

FIG. 11 shows the program for interchanging the two top 4×4 submatrices of an 8×8 matrix. In the first through the fourth row, the program carries out a "perfect shuffle" of the elements (FIG. 12), then interchanges neighboring elements before undoing the "perfect shuffle" or "unshuffling".

Figure 13:
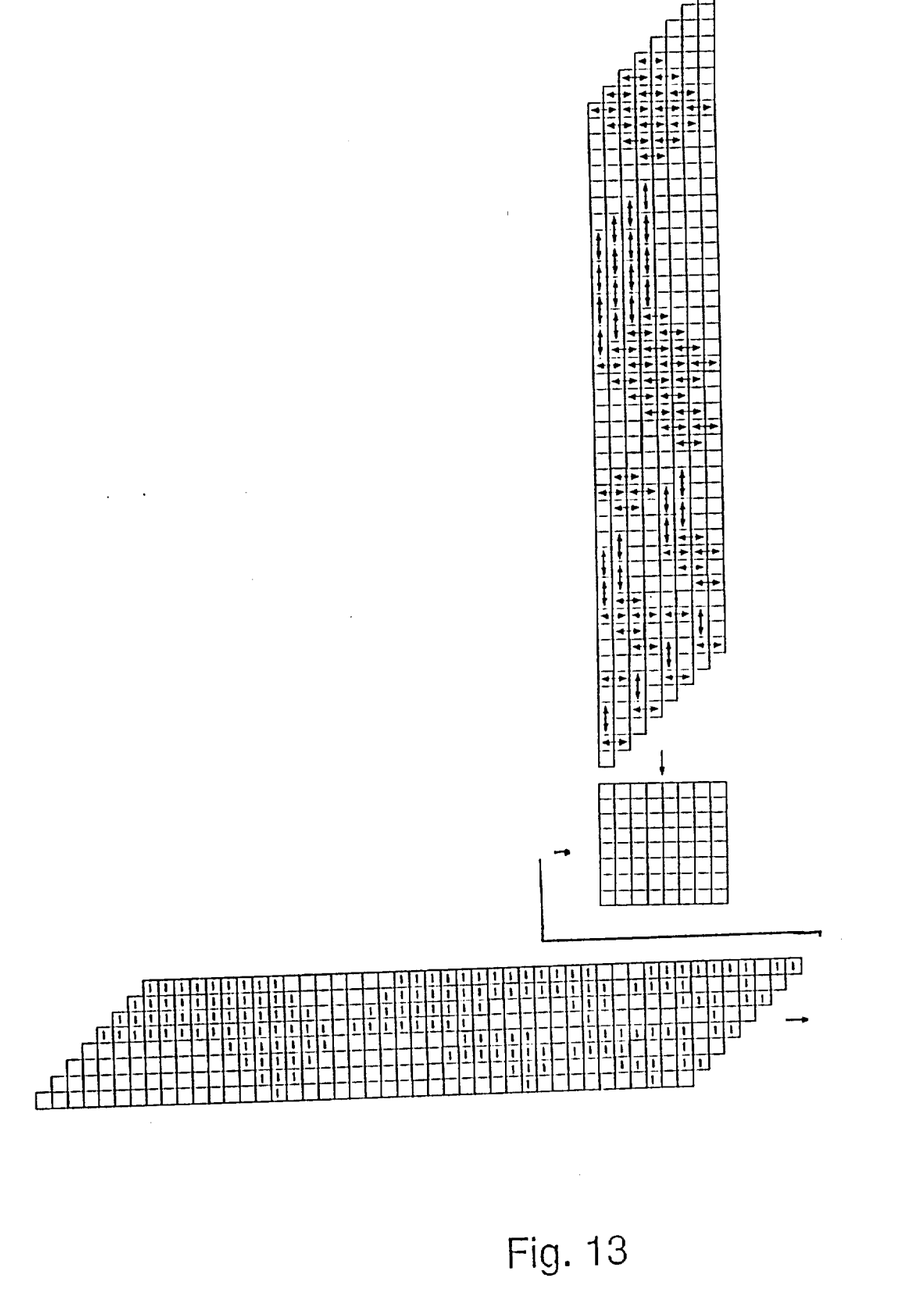
FIG. 13 is a schematic representation of a program for the transposition of an 8×8 matrix.

Submatrices situated one on top of the other can be interchanged in a similar manner. FIG. 13 illustrates the complete program for the transposition of an 8×8 matrix. Heavily drawn lines accentuate the three iteration steps (transposition of all 2×2, of all 4×4, and finally of the 8×8 matrix.

The proposed computer construction has the further advantage that as a result of the individual identity of the array cells, the exploitation of functionable chips is during their manufacture greater, in that individual defective processors on the chip can be deactivated and bypassed. Thus, for example, a smaller intact array can be created from a cell array in which cells are defective by "crossing out" the corresponding rows and/or columns. In this process, care must of course be paid that the two neighboring columns or rows of a "crossed out" column or row are interconnected. In this way, the "crossing out" of a row means that the connections between the cells (situated above these rows) and their neighbors below are deactivated, and that instead the connections with the processors situated below in the next but one row are activated. The cells situated beneath the crossed out row must correspondingly be connected with the processors situated above the next but one row.

The connection between the cells, those neighboring as well as those additional to the next but one cells, should be established as metal-lines in the final phase of the production process for the following reasons:

1. to keep the probability of the connections being defective signnificantly lower than the probability for the cells themselves being defective;

2. to minimize the delay time on the longer connections to the next but one processors;

3. to enable lines to be activated or deactivated via laser by hardware. Otherwise special control lines are necessary to activate and deactivate.

By applying VLSI technology, the computer construction proposed by this invention creates a parallel computer with a very large number of cells. Based on a clock frequency of 10 M/s and a data word length of 64 bits, a processing speed of approx. 150,000 operations per second per processor is achieved. A computer with 1000×1000 cells would therewith have a processing capacity of 150 billion operations per second. This results for the sorting of 1 million 64-bit data, for example (using an existing sorting algorithm based on the hardware construction proposed here), in a time requirement of less than a tenth of a second.

I claim:

1. A method for operating a highly integrated wavefront array processor having n×m processor cells arranged in n horizontal rows and m vertical columns with each processor cell connected to each of its horizontally and vertically adjacent processor cells, comprising the steps of shifting an instruction code in horizontal and vertical directions between adjacent processor cells from one processor cell to the respective next horizontally and vertically adjacent processor cell, and shifting a first group of n row selection bits and a second group of m column selection bits through the processor cell array to release certain processor cells for the execution of said instructions.

2. In a wavefront array processor having n×m processor cells, the improvement comprising an instruction shift register attached to each cell and connected to the instruction shift register of at least one of the adjacent cells, said instruction shift registers moving an instruction code diagonally through the cell array, and n row selection shift registers and m column selection shift registers which are connected with chosen ones of the respective cells of said one row or one column to release the cell for the execution of the instruction.

* * * * *